United States Patent [19]

Corompt

[11] Patent Number: 4,755,097
[45] Date of Patent: Jul. 5, 1988

[54] DEVICE FOR THE HANDLING AND TRANSFER OF A LOAD ON A VEHICLE SUCH AS A CONTAINER OR A TRAY

[75] Inventor: Antoine Corompt, Saint Eteinne, France

[73] Assignee: Bennes Marrel, France

[21] Appl. No.: 840,330

[22] Filed: Mar. 14, 1986

[51] Int. Cl.$^4$ ............................................. B65G 67/02
[52] U.S. Cl. .................................... 414/499; 414/534
[58] Field of Search ............... 414/477, 498, 499, 420, 414/491, 549, 556, 522, 478, 479, 494, 500, 529, 532, 533, 534, 536

[56] References Cited

U.S. PATENT DOCUMENTS

| | | | |
|---|---|---|---|
| 2,949,863 | 8/1960 | Cozzoli | 414/498 X |
| 3,006,487 | 10/1961 | Gelli | 414/522 |
| 3,132,755 | 5/1964 | Greenslate | 414/498 X |
| 3,138,276 | 6/1964 | Allen et al. | 414/499 X |
| 3,471,045 | 10/1969 | Panciocco | 414/522 |
| 3,485,400 | 12/1969 | Pewthers | 414/522 X |
| 4,621,972 | 11/1986 | Grotte | 414/491 X |

FOREIGN PATENT DOCUMENTS

| | | | |
|---|---|---|---|
| 2185520 | 1/1974 | France . | |
| 2315409 | 8/1979 | France . | |
| 2112358 | 7/1983 | United Kingdom | 414/498 |

*Primary Examiner*—Robert J. Spar
*Assistant Examiner*—Stuart J. Millman
*Attorney, Agent, or Firm*—Remy J. VanOphem

[57] ABSTRACT

A device for handling a container on a vehicle to permit the container to be tipped about an axis at the rear of the vehicle or to be loaded or unloaded. The device has a reciprocable frame which carries the tipping axis and is caused to reciprocate along the chassis of the vehicle by a horizontally extending hydraulic jack. The device includes hooks to secure the container in a fixed position before the vehicle is used for transporting the container.

11 Claims, 3 Drawing Sheets

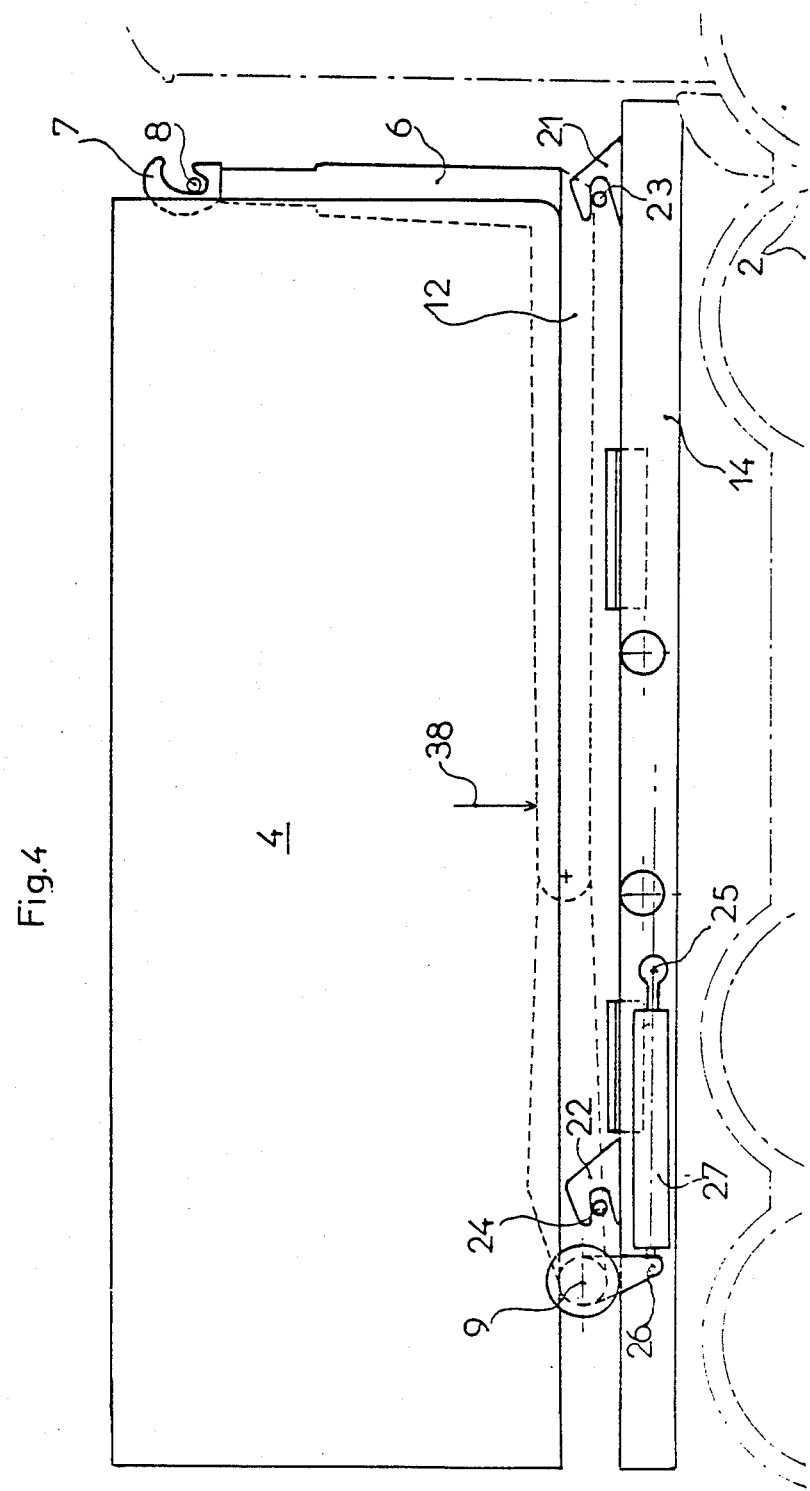

DEVICE FOR THE HANDLING AND TRANSFER OF A LOAD ON A VEHICLE SUCH AS A CONTAINER OR A TRAY

BACKGROUND OF THE INVENTION

1. Field of the Invention

This invention relates to a device to be fitted to a vehicle, such as a truck, in order to handle a load in a tray or in a container or to transfer such load from the vehicle.

2. Description of the Prior Art

Self contained equipment attached to a truck chassis to handle containers is already known, in particular that which carries out the following operations: lowers the container carried on the truck to the ground; loads the container from the ground on to the truck; and lifts the front of the container, causing it to pivot on the back of the truck for unloading purposes.

Such devices are described in various French patents including French patents Nos. 2,185,520 and 2,315,409. They are known under the commercial name of "AMPLIROLL".

In prior art devices, as described above, the vehicle has a container tipping axis. The tipping axis is located to the rear of the tipping rod which carries the container and is fixed and stationary in relation to the chassis of the truck and extends transversely thereof. This structure determines the placement of the center of gravity of the container carried by the truck on the chassis of the truck. Such placement of the center of gravity determines the distribution of the load between the various axles of the vehicle. This distribution of the load is satisfactory for certain transport vehicles. However, this distribution is not satisfactory when the load on the axle or axles is over 40% of the total load, which is the case in vehicles having two front axles.

SUMMARY OF THE INVENTION

The object of the present invention is to avoid the aforesaid shortcomings of the prior art, while maintaining the basic distance between the axles of a normal handling device. This provides an important power increase with this device (approximately 35%) to carry out the primary tipping operations.

A device according to the present invention has a conventional mechanism for the handling and tipping of loads carried on the chassis of a vehicle. This handling and tipping equipment is fitted to a frame which includes a device that enables it to slide backwards or forwards along the chassis when in position for carrying.

The sliding frame of the device of the present invention also incorporates two rectilinear slide bars which operate in connection with two longitudinal rails on the chassis.

Further, the central section of the rails of the chassis of the device of the present invention includes a number of loose rollers on which the slide bars of the frame can travel.

Further, the device of the present invention has sections which are bent into an L-shape and are placed over the rails of the chassis and extend over the flange of the mobile slide rails of the frame in order to prevent any sudden lifting of the device while in use.

Further, the chassis of the device of the present invention is equipped with hooks at the back and front, each having a jaw which faces upwards and towards the rear of the vehicle and locks crossbars on the sliding frame which latch under the hooks of the chassis when the frame is in position before transport. The transfer jack occupies an approximately horizontal position between the chassis and the sliding frame, taking up a minimum amount of space, thereby allowing the device to be fitted to various types of vehicles.

BRIEF DESCRIPTION OF THE DRAWINGS

FIG. 4 is a side elevational view of a transport vehicle according to the present invention which illustrates additional details of the transport vehicle according to the present invention.

DETAILED DESCRIPTION OF THE PREFERRED EMBODIMENT

Figure 1:
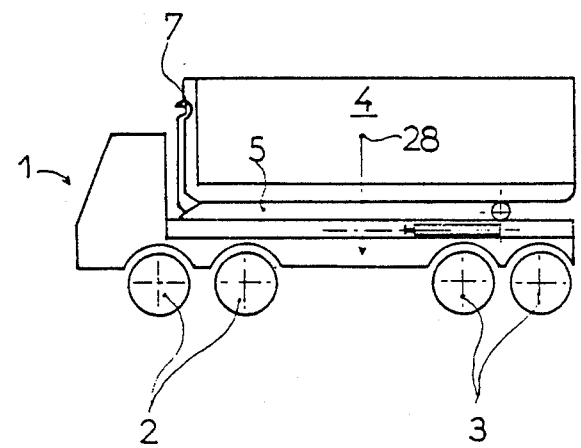
FIG. 1 is a schematic elevational view showing a transport vehicle with two front axles equipped with a device according to the preferred embodiment of the present invention carrying a container in place for road transport.

A device according to the present invention includes a truck 1 with two front axles 2 and two rear axles 3. The truck 1 is used to load, tip or handle a container 4 with the use of a handling mechanism 5 of the type known commercially as "AMPLIROLL," such as that described in French patents Nos. 2,185,520 and 2,315,409. The handling mechanism 5 includes a telescopic bracket with a vertical arm 6 at the front of the handling mechanism 5. An end of the vertical arm 6 is shaped into a hook 7. The hook 7 latches into a handle 8 which is fitted in a customary manner into the upper part of a front vertical panel of the container 4.

Figure 3:
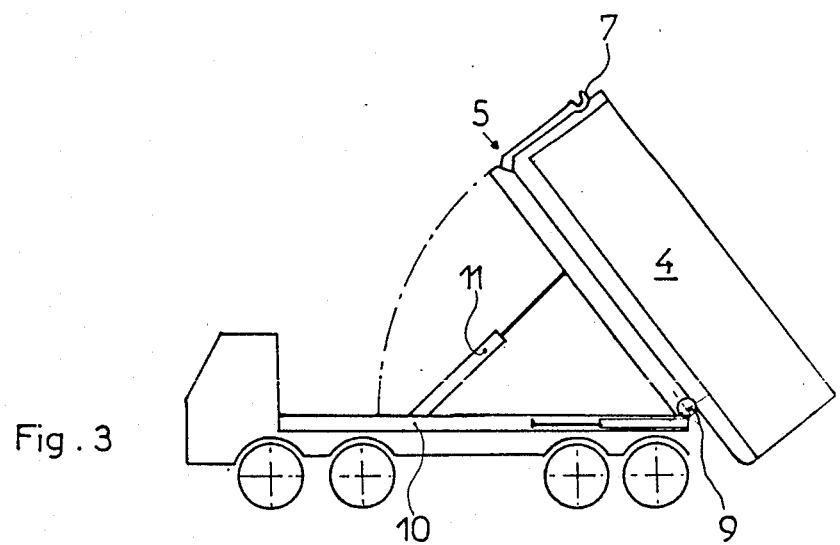
FIG. 3 is a view similar to FIGS. 1 and 2 which shows the transport vehicle in the tipping position.
Figure 5:
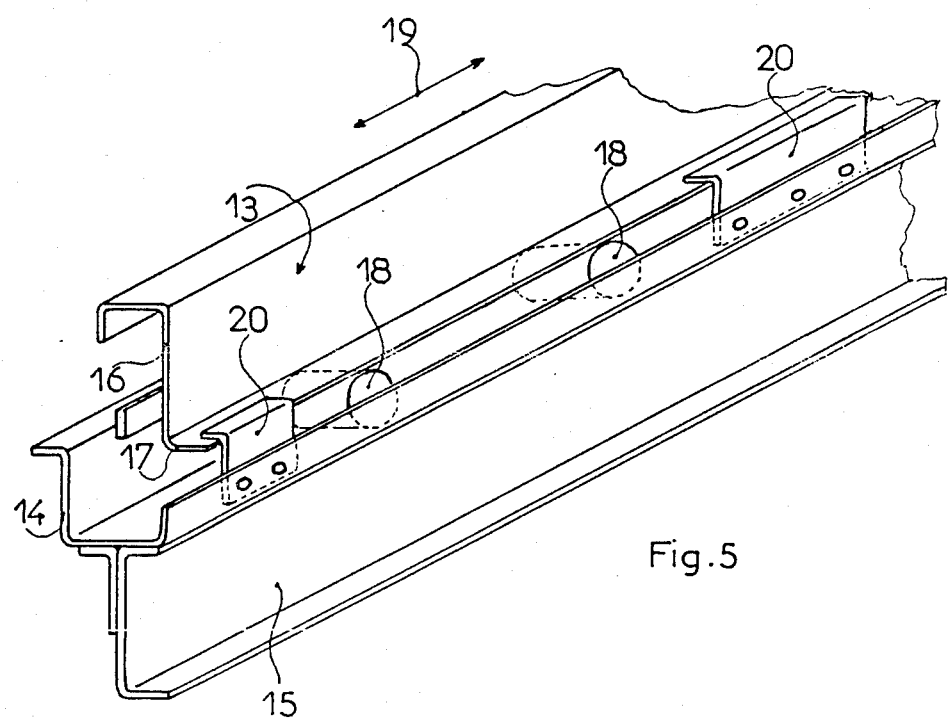
FIG. 5 is a fragmentary isometric view which shows the structure of one of the rails of the chassis of the transport vehicle and the slide on which the sliding frame is fitted.

According to the invention, the AMPLIROLL lifting mechanism 5 has a rear axis joint 9 and a lower fulcrum 10 on which a lifting jack 11 is mounted on a sliding trolley or frame 12, as is shown in FIG. 3. The frame 12 has two longitudinal slides 13, each of which can slide in a longitudinal rail 14 which is fitted to the upper section of the corresponding side sill on the chassis 15 of the truck 1.

Each slide 13 of the frame 12 has a U-shaped transversal section, open toward the bottom. The U-shaped transversal section has an inside flange 16 which terminates at its bottom end in a flange 17, which extends horizontally.

Each longitudinal rail 14 of the chassis has a U-shaped transversal section open towards the top. Inside the longitudinal rail 14 there are rollers 18 along which the flange 17 of the longitudinal slide 13 travels as it moves backwards or forwards as indicated by the double-ended arrow 19.

In order to prevent any lifting of the frame 12 above the longitudinal rails 14, above each longitudinal rail 14 is an L-shaped section of angle iron 20 which is positioned so as to fold over the flange 17 of each of the longitudinal slides 13.

Each longitudinal rail 14 is attached to the chassis 15 of the truck 1 and includes a front hook 21 and a rear hook 22. Each of the front hook 21 and the rear hook 22 has a jaw which faces upwards and towards the rear to latch onto a locking crossbar 23 at the front hook or a locking crossbar 24 at the rear hook as the case may be when the frame 12 is in its transport position, as is shown in FIGS. 1 and 4. The crossbars 23 and 24 are an integral part of the frame 12.

An hydraulic jack 27 is positioned to extend between an articulation point 25 on the longitudinal rails 14 and the side frames of the chassis 15 and a thrust point 26 on the frame 12. The hydraulic jack 27 is a two-way jack and is in a substantially horizontal position between the two longitudinal rails 14. The hydraulic jack 27 is hydraulically actuated and operated in a customary manner and includes associated elements well known in the art and which are not shown.

Figure 2:
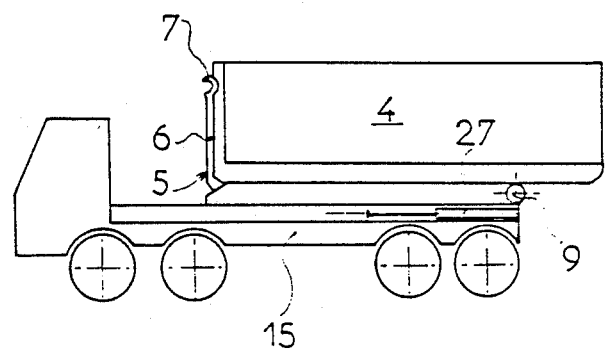
FIG. 2 is a view similar to FIG. 1 which shows the transport vehicle in its operational position for loading or unloading a container.

The device of the present invention operates as follows:

When the hydraulic jack 27 is extended, the frame 12 is in a position towards the rear of the vehicle 1, as shown in FIGS. 2 and 3. The AMPLIROLL handling mechanism 5 can then be used either to tip, by lifting the container 4 by means of the jack 11, as shown in FIG. 3, or to place the container 4 on the ground by using the vertical arm 6.

In the case of placing the container on the ground, the rear axis joint 9 is behind the chassis 15. However, when the container 4 is in the backward position, but horizontal, as is shown in FIG. 2, it is only necessary to operate the jack 27 to move the frame 12 and the handling mechanism 5 until the position shown in FIG. 1 is reached. Thus, the center of gravity 28 is brought forward of the rear axles 3, to a position for carrying which complies with applicable regulations for road transport. At the end of the forward movement of the frame 12, the locking crossbars 23 and 24 of the frame each latch under the corresponding hooks 21 and 22. Now in the carrying position as is shown in FIG. 4, the entire frame 12 is solidly locked onto the longitudinal rails 14 of the side frame, with the center of gravitational pull being designated by reference character 38.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A vehicle for handling and tipping a container on said vehicle, said vehicle being adapted to transport said container when said container is in position on said vehicle to be transported by said vehicle, said vehicle comprising:
    a chassis having a first side frame and a second side frame, said first side frame and said second side frame being spaced apart;
    a first longitudinal rail attached to said first side frame of said chassis, said first longitudinal rail having a first U-shaped section, said first U-shaped section having a first pair of upstanding projections forming a first central portion therebetween;
    a second longitudinal rail attached to said second side frame of said chassis, said second longitudinal rail having a second U-shaped section, said second U-shaped section having a second pair of upstanding projections forming a second central portion therebetween;
    a plurality of first loose rollers located in said first central portion of said first longitudinal rail, said plurality of first loose rollers being free from mutual interconnection, said plurality of first loose rollers being movable relative to said first longitudinal rail, said plurality of first loose rollers further being freely rollable on said first longitudinal rail;
    a plurality of second loose rollers located in said second central portion of said second longitudinal rail, said plurality of second loose rollers being free from mutual interconnection, said plurality of second loose rollers being movable relative to said second longitudinal rail, said plurality of second loose rollers further being freely rollable on said second longitudinal rail;
    a first longitudinal slide rollingly supported by said plurality of first loose rollers, said first longitudinal slide further being reciprocally movable in relation to said first longitudinal rail of said chassis;
    a second longitudinal slide rollingly supported by said plurality of second loose rollers, said second longitudinal slide further being reciprocally movable in relation to said second longitudinal rail of said chassis;
    a frame for supporting said container, said frame being partly supported on said first longitudinal slide and partly supported on said second longitudinal slide;
    means for reciprocating said frame on said chassis of said vehicle;
    means for holding said frame to said chassis of said vehicle;
    means for locking said frame to said chassis of said vehicle when said container is in position on said vehicle to be transported by said vehicle; and
    means for tipping said frame in relation to said chassis of said vehicle, said tipping means being mounted to said chassis.

2. A vehicle according to claim 1 wherein said first longitudinal rail has a first L-shaped member attached thereto and wherein said second longitudinal rail has a second L-shaped member attached thereto, each said first and said second L-shaped members including a generally horizontally extending flange, said first longitudinal slid being held down in relation to said first longitudinal rail by said horizontally extending flange of said first L-shaped member, said second longitudinal slide being held down in relation to said second longitudinal rail by horizontally extending flange of said second L-shaped member.

3. A vehicle according to claim 2 wherein each of said first longitudinal slide and said second longitudinal slide has a generally horizontally extending flange, said generally horizontally extending flange of said first longitudinal slide overlapping said generally horizontally extending flange of said first L-shaped member so as to hold down said first longitudinal slide in relation to said first longitudinal rail, said generally horizontally extending flange of said second longitudinal slide overlapping said generally horizontally extending flange of said second L-shaped member so as to hold down said second longitudinal slide in relation to said second horizontal rail.

4. A vehicle according to claim 3 wherein each of said first longitudinal slide and said second longitudinal slide also has a U-shaped member facing said chassis with a first leg and a second leg, said second leg being longer than said first leg, said generally horizontally extending flange of each of said first longitudinal slide and said second longitudinal slide being attached to said second leg thereof and extending away from said first leg thereof.

5. A vehicle according to claim 1 wherein said vehicle has a longitudinal axis and wherein said means for locking comprises:
front hook means on said chassis;
rear hook means on said chassis and spaced from said front hook means along said longitudinal axis of said vehicle;
front locking crossbar means on said frame, said front locking crossbar means being adapted to be engaged by said front hook means; and
rear locking crossbar means on said frame, said rear locking crossbar means being adapted to be engaged by said rear hook means when said front locking crossbar means is engaged by said front hook means.

6. A vehicle according to claim 1 wherein said means for reciprocating comprises a two-way hydraulic jack, one end of said two-way hydraulic jack being attached to said chassis, another end of said two-way hydraulic jack being attached to said frame.

7. A vehicle according to claim 6 wherein said one end of said hydraulic jack is attached to said chassis at an articulation point and wherein said other end of said hydraulic jack is attached to said frame at a thrust point, said hydraulic jack extending generally horizontally between said articulation point and said thrust point.

8. A vehicle for handling and tipping a container on said vehicle, said vehicle being adapted to transport said container when said container is in position on said vehicle to be transported by said vehicle, said vehicle comprising:
a chassis having a first side frame and a second side frame, said first side frame and said second side frame being spaced apart, said chassis further having a first longitudinal rail attached to said first side frame of said chassis and a second longitudinal rail attached to said second side frame of said chassis, each of said first longitudinal rail and said second longitudinal rail having a U-shaped section facing in a direction away from said chassis, each of said U-shaped sections further having a central portion; loose roller means mounted in said central portion of each said U-shaped sections; said first longitudinal rail further having a first L-shaped member attached thereto and said second longitudinal rail further having a second L-shaped member attached thereto, said first L-shaped member and said second L-shaped member including a generally horizontally extending flange;
a frame for supporting said container, said frame being reciprocable in relation to said chassis of said vehicle, said frame comprising a first longitudinal slide and a second longitudinal slide, said first longitudinal slide being reciprocably movable in relation to said first longitudinal rail of said chassis and said second longitudinal slide being reciprocably movable in relation to said second longitudinal rail of said chassis as said frame reciprocates in relation to said chassis of said vehicle, said first longitudinal slide and said second longitudinal slide being spaced apart, said first longitudinal slide further being rollingly supported by said loose roller means mounted in said central portion of said U-shaped section of said first longitudinal rail and said first longitudinal slide being rollingly supported by said loose roller means mounted in said central portion of said U-shaped section of said second longitudinal rail, each of said first longitudinal slide and said second longitudinal slide have an inverted U-shaped section including a pair of projections, one of said projections being longer than the other of said projections, a generally horizontally extending flange being attached to said one of said projections, said first longitudinal slide being held down in relation to said first longitudinal rail by said horizontally extending flange thereof overlapping said horizontally extending flange of said first L-shaped member and said second longitudinal slide being held down in relation to said second longitudinal rail by said horizontally extending flange thereof overlapping said horizontally extending flange of said second L-shaped member;
means for reciprocating said frame on said chassis of said vehicle;
means for locking said frame to said chassis of said vehicle when said container is in position on said vehicle to be transported by said vehicle; and
means adjacent said frame for tipping said frame in relation to said chassis of said vehicle, said tipping means being mounted to said chassis.

9. A vehicle according to claim 8 wherein said vehicle has a longitudinal axis and wherein said means or locking comprises:
front hook means on said chassis;
rear hook means on said chassis and spaced from said front hook means along said longitudinal axis of said vehicle;
front locking crossbar means on said frame, said front locking crossbar means being adapted to be engaged by said front hook means; and
rear locking crossbar means on said frame, said rear locking crossbar means being adapted to be engaged by said rear hook means when said front locking crossbar means is engaged by said front hook means.

10. A vehicle according to claim 9 wherein said means for reciprocating comprises a two-way hydraulic jack, one end of said two-way hydraulic jack being attached to said chassis, another end of said two-way hydraulic jack being attached to said frame.

11. A vehicle according to claim 10 wherein said one end of said two-way hydraulic jack is attached to said chassis at an articulation point and wherein said other end of said two-way hydralic jack is attached to said frame at a thrust point, said two-way hydraulic jack extending generally horizontally between said articulation point and said thrust point.

* * * * *

UNITED STATES PATENT AND TRADEMARK OFFICE
CERTIFICATE OF CORRECTION

PATENT NO. : 4,755,097
DATED : July 5, 1988
INVENTOR(S) : Antoine Corompt

It is certified that error appears in the above-identified patent and that said Letters Patent is hereby corrected as shown below:

Column 4, line 29, delete "partily" and insert ---- partly ----.

Column 4, line 48, delete "slid" and insert ---- slide ----.

Column 4, line 52, after "by" insert ---- said ----.

Column 6, line 13, delete "have" and insert ---- having ----.

Column 6, line 59, delete "hydralic" and insert ---- hydraulic ----.

Signed and Sealed this

Thirteenth Day of December, 1988

Attest:

DONALD J. QUIGG

*Attesting Officer*  *Commissioner of Patents and Trademarks*